Jan. 1, 1935.  I. H. PECK  1,986,523
MACHINE FOR BUNCHING HAIRPINS
Filed Sept. 28, 1933  3 Sheets-Sheet 1

Inventor
Irving H. Peck
By Rockwell + Bartholow
Attorney

Jan. 1, 1935.  I. H. PECK  1,986,523
MACHINE FOR BUNCHING HAIRPINS
Filed Sept. 28, 1933  3 Sheets-Sheet 2
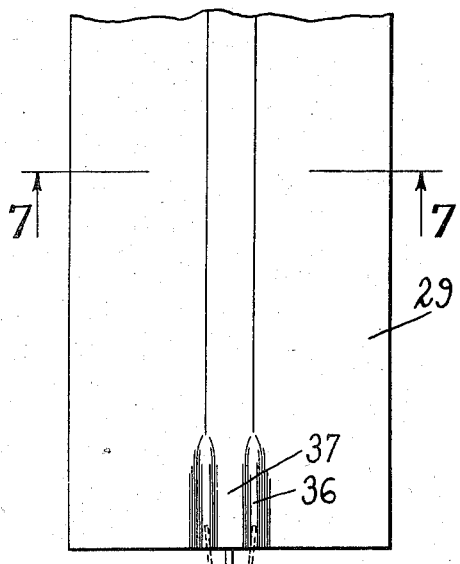
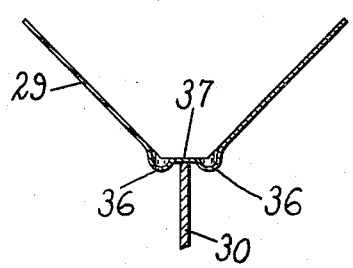
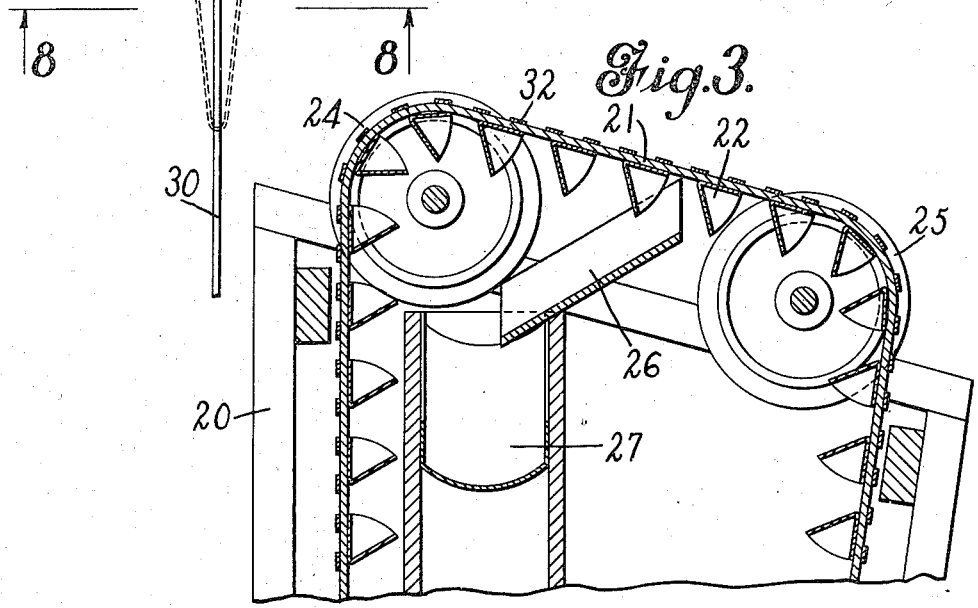
Inventor
Irving H. Peck,
By
Attorneys Jan. 1, 1935.  I. H. PECK  1,986,523
MACHINE FOR BUNCHING HAIRPINS
Filed Sept. 28, 1933   3 Sheets-Sheet 3
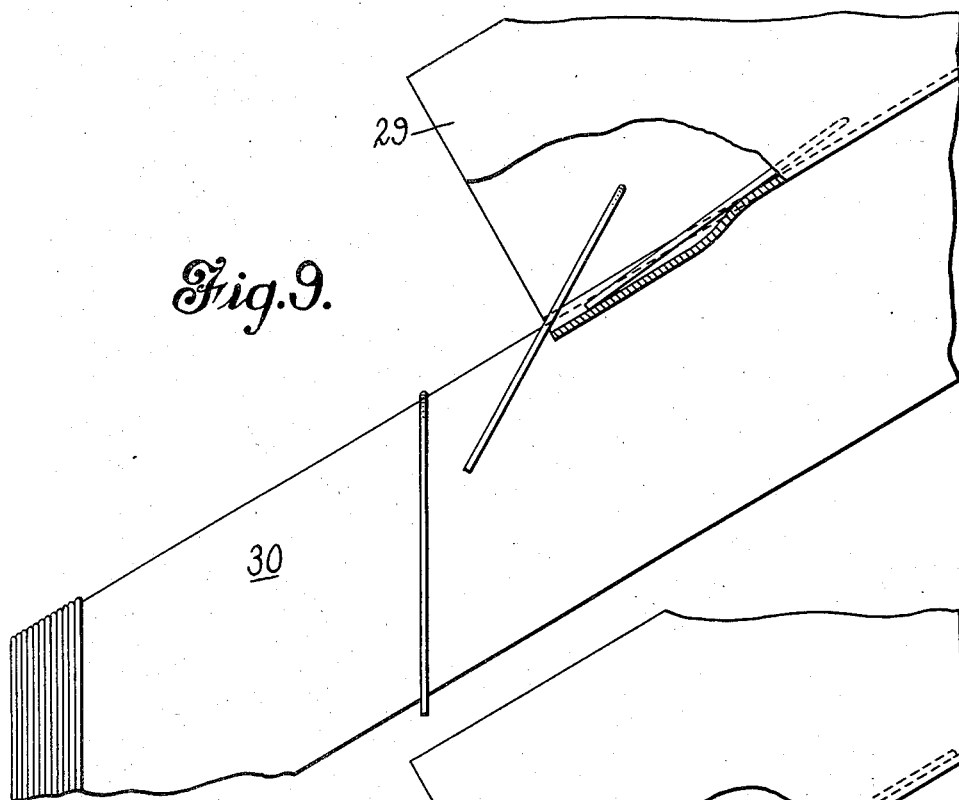
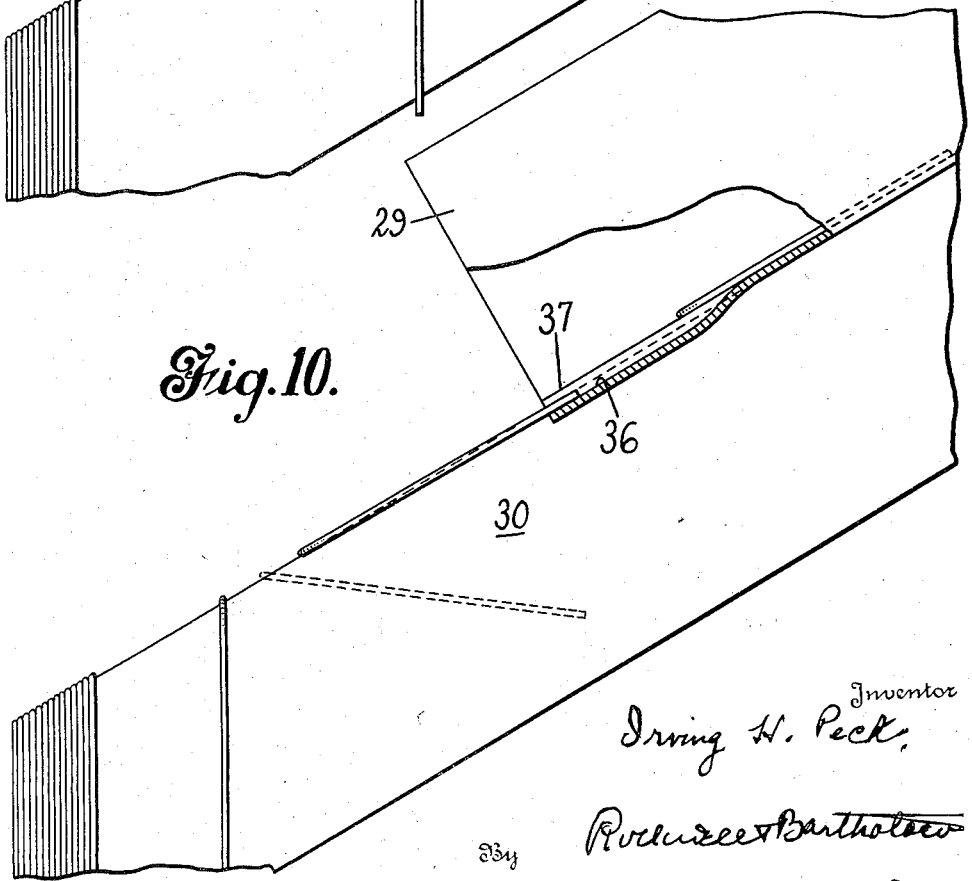

Patented Jan. 1, 1935

1,986,523

UNITED STATES PATENT OFFICE 1,986,523

MACHINE FOR BUNCHING HAIRPINS

Irving H. Peck, Derby, Conn.

Application September 28, 1933, Serial No. 691,276

20 Claims. (Cl. 163—8)

This invention relates to a machine for bunching hairpins and is an improvement upon the machines shown in my Patents Nos. 672,330 and 672,331 of April 16, 1901, and No. 1,246,648 of November 13, 1917.

In the manufacture of hairpins, the hairpins are brought from the machines in masses wherein the individual hairpins are considerably interentangled, and it is expedient before the hairpins are placed in boxes or applied to cards to separate and sort them by mechanical means of the type shown in my previous patents. In the machine shown in Patent No. 1,246,648, for example, the hairpins are separated from each other by instrumentalities including a separating drum and a plurality of troughs or chutes to which the hairpins are carried by an endless conveyer. In the machine shown in that patent those hairpins which pass down the troughs or chutes with their legs or points directed forwardly, or a certain percentage of them, are caught on a track and held in position to be taken off by the operator in bunches of the required number. Those hairpins which pass down the chutes with their looped or butt ends foremost are rejected and dropped down into the lower portion of the machine and come again into the path of the conveyer so as to be carried up to the troughs and passed thereover a second time.

One of the objects of my present invention is to improve the structure of the machine considerably so far as efficiency is concerned.

Another object is to provide a machine in which the number of hairpins which have to pass over the troughs or chutes more than once will be considerably reduced.

Another object is to provide improved means for separating masses of interentangled hairpins.

I also have in view the provision of a machine having means for catching and separating hairpins travelling downwardly over a chute whether these hairpins have their looped ends or their pointed ends foremost. In my prior machines hairpins which had their looped or butt ends foremost were not caught by the track on which the hairpins were bunched, but in accordance with my present improvements there is provided a device associated with the lower end portion of a chute to catch and transfer hairpins having their loops foremost, as well as hairpins having their points foremost, and this means is of a simple and yet effective nature and considerably increases the efficiency and capacity of the machine.

To these and other ends the invention consists in the novel features and combinations of parts to be hereinafter described and pointed out in the claims.

In the accompanying drawings:

Fig. 3 shows on an enlarged scale a sectional view of the upper portion of Fig. 1, taken on line 3—3 of Fig. 2;

Fig. 6 is an enlarged plan view of the lowermost chute and a portion of the hairpin-catching track associated therewith;

Figures 11, 12:
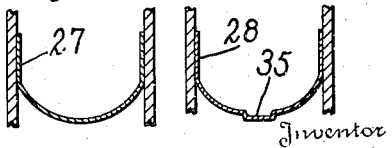

Figs. 7 and 8 are sections, respectively, on lines 7—7 and 8—8 of Fig. 6;

Figs. 9 and 10 are enlarged fragmentary side elevations of the lower chute and its associated track illustrating the manner in which the hairpins are caught; and Figs. 11 and 12 are transverse sections of the upper chutes.

In the machine selected for illustration a number of troughs or chutes are arranged at different elevations, and an endless conveyer is adapted to carry hairpins to the uppermost chute. The hairpins pass downwardly over the chutes, being in the meantime separated from each other to a certain extent, and after the hairpins pass over the lowermost chute a considerable number of them are caught on a suitable track, where they are held until taken off by the operator in generally the manner described in my previous patents, above mentioned. Those hairpins which are not caught on the track pass downwardly into the lower part of the machine and are caught again by the conveyer belt and carried upwardly again so as to pass over the chutes again. My improvements are primarily concerned with the means for causing the hairpins passing downward over the chute or chutes to be engaged and caught by the track on which the hairpins are bunched, but I have also provided certain improvements in other features, as hereinafter pointed out.

Figure 1:
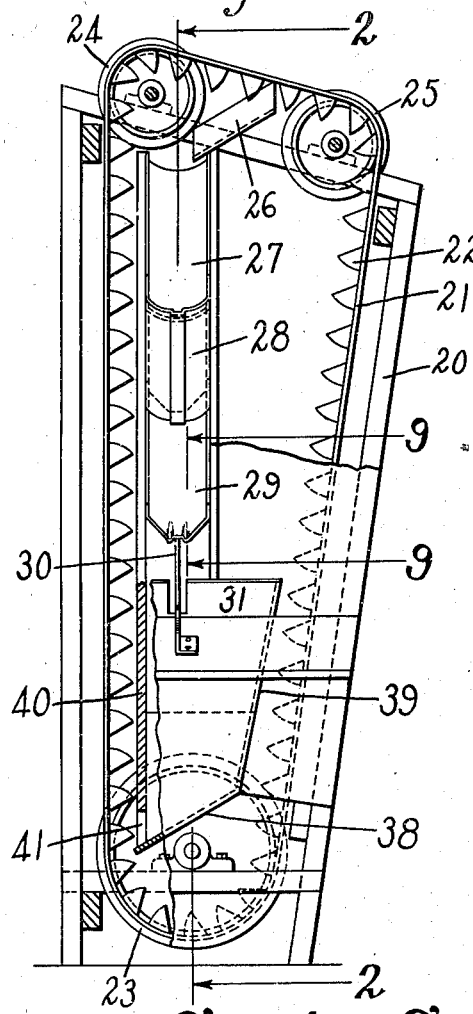
Fig. 1 is a front elevational view partly in section of a machine constructed in accordance with the invention.
Figure 2:
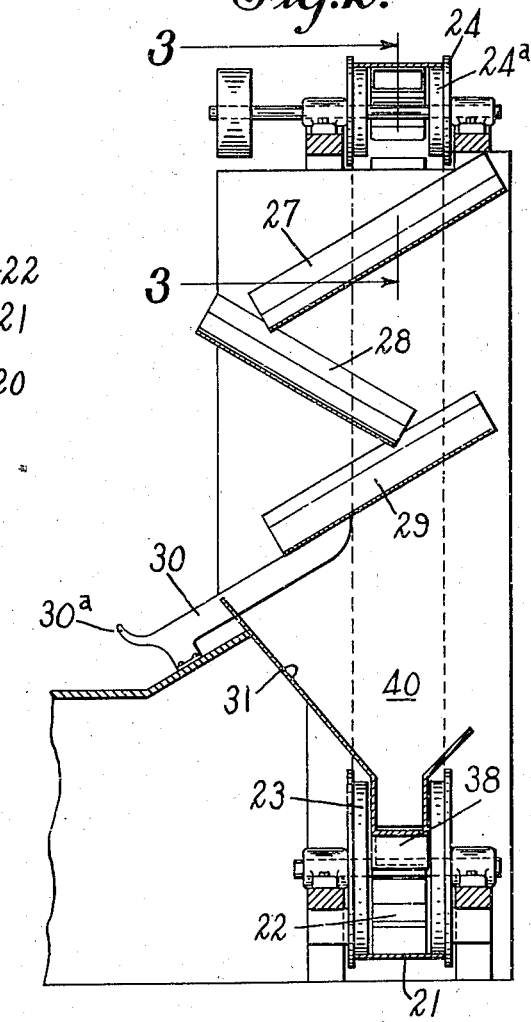
Fig. 2 is a section on line 2—2 of Fig. 1.
Figure 4:
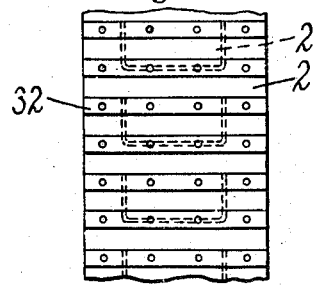
Fig. 4 is a detail of the conveyer belt.

In the particular case shown in the drawings, the machine has a frame 20 in which the conveyer is arranged, said conveyer being shown at 21 and being in the form of an endless band having its orbit disposed in a vertical plane, there being a number of chutes located within this orbit, in this instance three principal chutes. The conveyer band or belt is provided on its inner surface with a plurality of buckets 22, and this band is supported and passes over a lower pulley element 23 and upper pulley elements 24 and 25. The band has in general a triangular orbit, as shown more particularly in Fig. 1, the upper reach of the band being rather short and slanting downwardly slightly from pulley element 24 to pulley element 25. In between these two pulley elements is a short trough or deflecting element 26 which receives the hairpins from the band buckets and causes them to slide downwardly to an upper chute 27 which delivers the hairpins to an intermediate oppositely inclined chute 28, which in turn delivers the hairpins to an oppositely inclined chute 29. From the chute 29 the hairpins pass to the collecting track 30, but hairpins which fail to be caught by tracks 30 and which drop vertically from chute 29 are caught by a deflecting wall 31 and conducted to a point where they will be delivered into the buckets on the ascending reach of the conveyer. Preferably the ascending reach of the conveyer is vertically disposed, as shown in Fig. 1, and the descending reach at the opposite side of the triangle is disposed on a slight incline to the vertical, as shown.

Figure 5:
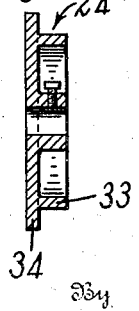
Fig. 5 is a detail of one of the conveyer belt pulleys.

The body portion of the band 21 is formed of any suitable flexible material, and this body portion has applied to it on the outside a plurality of transversely arranged metal strips 32, which may be applied to the band by riveting, for example. The buckets 22 are preferably of triangular cross-section and are applied to the inner surface of the band, the upper edge portion of each bucket being riveted to the band and to a strip 32 located adjacent the upper edge of the bucket. The lower ends of the buckets are preferably free from the band. For the purpose of properly guiding the band the pulley elements are provided with flanges, and I prefer to form each pulley of two separate disk-like elements provided with flanges and separately attached to the pulley shaft. In Fig. 5 I have shown one of the disk-like elements 24ª forming part of pulley 24 for example, this element having the body portion 33 for guiding the band and the retaining flange 34. The other pulley elements 23 and 25 are similarly constructed.

It will be observed that while the trough 26 is in this particular instance located in the general plane of the conveyer band, the other chutes 27, 28 and 29 are located in a plane at right angles to the plane of the conveyer band. While I have shown three principal chutes 27, 28 and 29, the number may be varied as called for by different conditions. Also it will be understood that while the chutes 27, 28 preferably have the cross-sectional form shown in the drawings, the chute 27 having a cross-section in the form of a U and the chute 28 being in the shape of a U having a slight groove or depression 35 in the bottom thereof, considerable variation may be made in these respects.

It will be observed that in my present machine one of the inclined trough-like chutes over which the hairpins pass downwardly (in this instance the chute 29) delivers the hairpins, or at any rate a large number of the descending hairpins, to the collecting track 30 whether the points of the hairpins or the loops thereof are directed downwardly as the hairpins traverse the chute 29. There is a direct delivery of the hairpins from the lower end of chute 29 to the upper end portion of collecting track 30. I prefer to accomplish this by the arrangement shown in the drawings wherein chute 29 and track 30 are alined with each other and set at approximately the same inclination to the vertical, a portion of the track 30 adjacent its upper extremity underlying the lower portion of chute 29. Preferably but not necessarily the chute 29 is of approximately V-shaped cross-section, as shown in Fig. 7, the bottom of the V being somewhat flattened. The width of the flattened portion at the bottom of the V will approximate that of a finished hairpin, and the tendency of the hairpins passing down over chute 29 will be to descend to the bottom of the V and to be turned into the longitudinal axis of the chute so as to pass downwardly over the flat bottom thereof either with the points of the hairpin or with the loop portion thereof downwardly directed. Near the lower end of the chute 29 the bottom of the chute is preferably somewhat narrowed, and at the margins of the flat bottom longitudinal grooves 36 are provided, as shown more particularly in Fig. 8. The bottoms of these grooves 36 extend downwardly below the bottom middle portion of the chute, which is indicated at 37 in Fig. 8. The track 30 may advantageously comprise a thin sheet of metal or other suitable material, which is alined with the channel formed in chute 29, as shown in Fig. 6, and forms an extension of this chute on to which the hairpins ride. At its upper extremity the upper edge of the plate constituting track member 30 engages the under surface of the chute at the portion 37 thereof, as shown in Fig. 8. I have shown the chute 29 and track 30 as having the same inclination, that is to say, the upper edge of the track as having the same inclination as the bottom of the chute, but this is not necessary in all cases.

At its lower end portion the track member 30 preferably has a hook-like terminal 30ª acting as a stop to arrest the hairpins and cause them to be collected in a bunch at the lower end of the track.

The deflecting wall 31 previously mentioned, which is located beneath the upper portion of the collecting track 30, forms a part of a hopper-like structure at the lower portion of the machine adapted to receive hairpins in the open upper end thereof and to deliver them to the ascending reach of the conveyer. This hopper-like structure may vary considerably in its construction, but I prefer to provide such a structure in which the inclined wall 31 forms the front part and in which an inclined bottom 38 is provided, an inclined side 39, and an approximately vertical side 40 opposite the side 39. The side 40 of the hopper is adjacent and substantially parallel to the ascending reach of the conveyer and has an opening 41 at its lower end through which hairpins descending over hopper bottom member 38 fall into the open upper ends of the adjacent conveyer buckets.

In the operation of the machine hairpins thrown into the hopper structure at the lower part of the machine are delivered to the buckets of the conveyer and carried upwardly until the buckets reach the downwardly slanted upper reach of the conveyer, at which time the hairpins are dumped into the short trough 26. From the trough 26 they pass down the chute 27, which is of such shape that the hairpins tend to become longitudinally alined with it as they pass downwardly over this chute. This chute then delivers the hairpins to the chute 28 arranged at a different and opposite inclination, and in the chute 28 the hairpins are further separated from each other and the tendency to bring them into longitudinal alinement with the chute is increased by the provision of the bottom groove 35. The hairpins are then delivered to the chute 29, and the tendency of this chute also is to aline the hairpins longitudinally with it as they pass down over it. Supposing that the points of the hairpins are lowermost as it slides down along the bottom of chute 29, it will be seen that as the lower end of the chute is reached the legs of the hairpin engage the grooves 36, and thus being in a location somewhat below the upper edge of the track 30 they readily straddle and are caught on the track upon further downward movement of the hairpins, as shown in Fig. 9. On the other hand, if the loop portion of the hairpin is lowermost, this loop portion rides over the flattened portion 37 adjacent the lower end of the chute and then drops down slightly and contacts with the upper edge of the track. The legs of the hairpin engage the grooves 36, and then when they have passed completely beyond the lower extremity of the chute, the hairpin swings downwardly, as shown by the dotted lines in Fig. 10, until it has completely straddled the track and has reached a substantially vertical position, as shown by the full lines at the lower part of Fig. 10.

It will be understood that in practice a large number of hairpins will be passing through the machine and that a number of the hairpins will not be sufficiently separated and alined with the chutes as they pass through the chutes to catch on the track. Any hairpins which fail to catch on the track fall down again into the hopper and are carried upwardly again by the conveyer to the set of chutes.

By so disposing the track member that it catches hairpins having their loops lowermost, as well as hairpins having their pointed ends lowermost, the output of the machine is considerably increased as compared to prior machines. Owing to the features of structure herein described the improved machine has a large capacity and operates effectively and satisfactorily.

I have not attempted to illustrate or describe the various changes in the construction herein described which may be made without departing from the principles of my invention. I have shown a single embodiment only, but it is to be understood that the invention may take many different forms without departure from my inventive concept as expressed in the claims.

What I claim is:

1. A hairpin bunching machine comprising a channeled inclined chute over which the hairpins travel downwardly, and a stationary track member which extends in substantially the same direction as the chute and receives directly from said chute and collects hairpins having their loop ends downwardly disposed and hairpins having their pointed ends downwardly disposed.

2. A hairpin bunching machine comprising a channeled inclined chute over which the hairpins travel downwardly, and a stationary track member which receives from said chute hairpins having their loop ends downwardly disposed and hairpins having their pointed ends downwardly disposed, said track member being in substantial axial alinement with said chute and extending therefrom at the end so that the hairpins ride from the chute into straddling engagement with the track member.

3. In a hairpin bunching machine, the combination of a downwardly inclined trough-like chute and a stationary hairpin-collecting member in the form of a plate extending from said chute at the lower end thereof in substantially the same direction as the chute.

4. In a hairpin bunching machine, the combination of a downwardly inclined trough-like chute and a collecting track member inclined in the same direction as the chute and forming an extension for the chute at the lower end of the chute.

5. In a hairpin bunching machine, the combination of a downwardly inclined trough-like chute and a collecting track member inclined in the same direction as the chute and forming an extension for the chute at the lower end of the chute, said track member being arranged to have the hairpins ride on to the same directly from the chute in straddling engagement with said track member whether the loop ends or the pointed ends of the hairpins passing down over the chute are foremost.

6. In a hairpin bunching machine, the combination of a trough-like chute arranged at an inclination to the vertical and over which the hairpins travel downwardly, a second chute oppositely inclined by which the hairpins are received from the first chute, and an extension having a hairpin-collecting upper edge extending from the lower end portion of the second chute, said extension having substantially the same inclination and direction as the second chute.

7. In a hairpin bunching machine, the combination of a trough-like chute arranged at an inclination to the vertical and over which the hairpins travel downwardly, a second chute oppositely inclined by which the hairpins are received from the first chute, and an extension on the lower end portion of the second chute having substantially the same inclination and direction as the second chute, on which the hairpins are collected, said extension being in the form of a thin plate having its edge engaging the under surface of the chute.

8. In a hairpin bunching machine, the combination of a plurality of chutes over which the hairpins travel downwardly, and a conveyer which carries hairpins upwardly to the uppermost chute, said conveyer comprising an endless band passing around the chutes and the plane of said band being substantially perpendicular to the chutes.

9. In a hairpin bunching machine, an endless conveyer belt disposed substantially to form a triangle, one of the sides of the triangle presenting an upper reach having a downward slant, said belt having buckets on the inner surface thereof, and a plurality of chutes over which the hairpins pass after discharge from the buckets, said buckets discharging the hairpins as the buckets pass along the upper reach of the belt.

10. In a hairpin bunching machine, an endless conveyer belt having buckets on its inner surface and arranged in the form of a triangle having an upper downwardly slanting run or reach causing the movement of the buckets to a discharging position, and a plurality of chutes disposed within the belt and under the discharging buckets.

11. In a hairpin bunching machine, an endless conveyer belt having buckets on its inner surface and arranged in the form of a triangle, one of the sides of the triangle presenting a downwardly slanting upper reach of the belt, a chute to receive the hairpins discharged by the buckets as they pass along the upper reach or run of the belt, said chute arranged substantially in the plane of the belt, and other chutes over which the hairpins pass and to which they are delivered by said first chute, said other chutes being substantially perpendicular to the plane of the belt.

12. In a hairpin bunching machine, an endless conveyer belt in a vertical plane having buckets on the inner surface thereof, said buckets arranged to discharge when they reach the upper part of the belt, and hairpin-separating means arranged in the loop of the belt to catch the discharging hairpins.

13. In a hairpin bunching machine, an endless conveyer belt in a vertical plane having buckets on the inner surface thereof, said buckets arranged to discharge as they pass along an upper reach or run of the belt, and a plurality of chutes over which the hairpins pass after discharge from the buckets.

14. A hairpin bunching machine having a downwardly inclined chute over which the hairpins travel, and a similarly inclined stationary collecting plate having a thin upper edge on to which the hairpins ride directly from the chute.

15. A hairpin bunching machine having an inclined chute, and a collecting track in the form of a plate having its edge extending under the chute, said plate forming a continuation of said chute.

16. A hairpin bunching machine having a downwardly inclined chute over which the hairpins travel, and a collecting plate at the lower end of the chute alined therewith and forming a continuation of the chute in the direction of the longitudinal axis thereof.

17. A hairpin bunching machine having a downwardly inclined chute over which the hairpins travel, and a collecting plate at the lower end of the chute forming a continuation thereof, said plate having a thin upper edge extending under the chute and said chute being provided in the bottom on opposite sides of the plate with grooves having their bottoms located below the upper edge of the plate.

18. A hairpin bunching machine having a chute provided with a flat bottom and with inclined side walls, the bottom part of the chute adjacent the lower end thereof being provided with longitudinal grooves at the sides, and a plate extending outwardly from the end of the chute adjacent the bottom thereof in alinement with the space between said grooves.

19. In a hairpin bunching machine, an inclined channel-like chute, and a collecting plate presented edgewise to the chute at the lower end thereof in substantially abutting relation and disposed in a vertical plane.

20. In a hairpin bunching machine, a chute having a substantially flat bottom along which the hairpins travel, and a collecting track arranged as a continuous extension of the chute and having its plane substantially perpendicular to that of the chute bottom.

IRVING H. PECK.